US011944052B2

(12) United States Patent
Moffitt et al.

(10) Patent No.: US 11,944,052 B2
(45) Date of Patent: Apr. 2, 2024

(54) CULTIVATION VESSEL AND ASSEMBLY

(71) Applicant: STEM Cultivation, Inc., Woburn, MA (US)

(72) Inventors: Kyle W. Moffitt, Woburn, MA (US); Kaylor Moffitt, Woburn, MA (US)

(73) Assignee: STEM Cultivation, Inc., Woburn, MA (US)

( * ) Notice: Subject to any disclaimer, the term of this patent is extended or adjusted under 35 U.S.C. 154(b) by 0 days.

(21) Appl. No.: 17/157,191

(22) Filed: Jan. 25, 2021

(65) Prior Publication Data

US 2021/0227755 A1 Jul. 29, 2021

Related U.S. Application Data

(60) Provisional application No. 62/965,312, filed on Jan. 24, 2020.

(51) Int. Cl.
*A01G 9/02* (2018.01)

(52) U.S. Cl.
CPC .................................. *A01G 9/023* (2013.01)

(58) Field of Classification Search
CPC ................................ A01G 9/023; A01G 9/022
See application file for complete search history.

(56) References Cited

U.S. PATENT DOCUMENTS

| 10,772,270 | B2 * | 9/2020 | Linneberg | A01G 9/022 |
|---|---|---|---|---|
| 2017/0258015 | A1 * | 9/2017 | Cudmore | C05F 17/964 |
| 2018/0084744 | A1 * | 3/2018 | Tidona | A01G 9/023 |
| 2020/0008378 | A1 * | 1/2020 | Van Buuren | A01G 27/005 |
| 2020/0205351 | A1 * | 7/2020 | Leon | A01G 25/167 |
| 2020/0236864 | A1 * | 7/2020 | Henry | A01G 27/003 |
| 2020/0315100 | A1 * | 10/2020 | Kiessling | A01G 9/023 |
| 2021/0007301 | A1 * | 1/2021 | Do | A01G 27/04 |
| 2021/0161090 | A1 * | 6/2021 | Hatran | A01G 31/06 |
| 2021/0185953 | A1 * | 6/2021 | Bryan, III | A01G 31/02 |
| 2021/0212276 | A1 * | 7/2021 | Hersh | A01G 31/06 |
| 2021/0227763 | A1 * | 7/2021 | Bryan, III | A01G 9/023 |
| 2021/0392834 | A1 * | 12/2021 | Rouxel | A01G 9/022 |
| 2022/0174881 | A1 * | 6/2022 | Tompkin | F21V 23/003 |
| 2022/0272908 | A1 * | 9/2022 | Pari | A01G 9/023 |

FOREIGN PATENT DOCUMENTS

| WO | WO-2019185534 A1 * | 10/2019 | A01G 27/008 |
|---|---|---|---|
| WO | WO-2020076729 A1 * | 4/2020 | A01G 31/02 |
| WO | WO-2021204921 A1 * | 10/2021 | |

* cited by examiner

*Primary Examiner* — Monica L Perry
*Assistant Examiner* — Aaron M Rodziwicz
(74) *Attorney, Agent, or Firm* — DALY, CROWLEY, MOFFORD & DURKEE, LLP

(57) ABSTRACT

A modular vessel assembly configured to hold one or more plants in a cultivation environment is provided. The vessel assemblies may be assembled from multiple components, each component having an identical design. Aspects of the present disclosure allow for high-volume production of a single component that is versatile enough to join with other identical or substantially similar components to form a tower of vessels configured to hold a number of plants during cultivation.

14 Claims, 9 Drawing Sheets

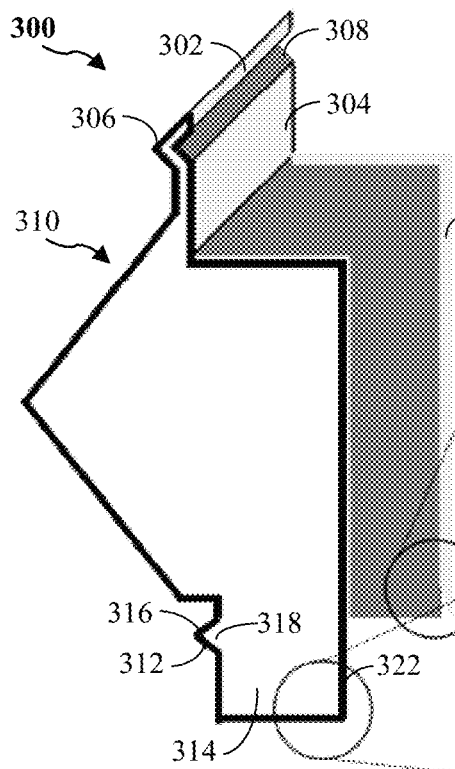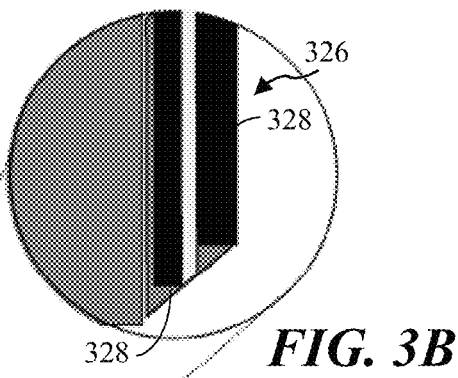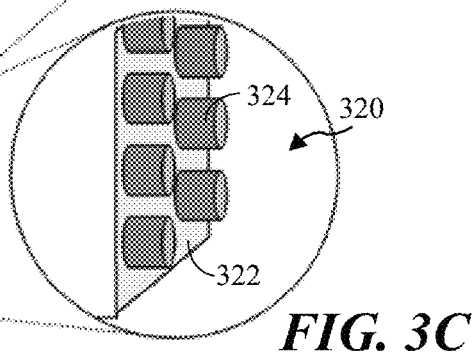
FIG. 3A  FIG. 3B  FIG. 3C
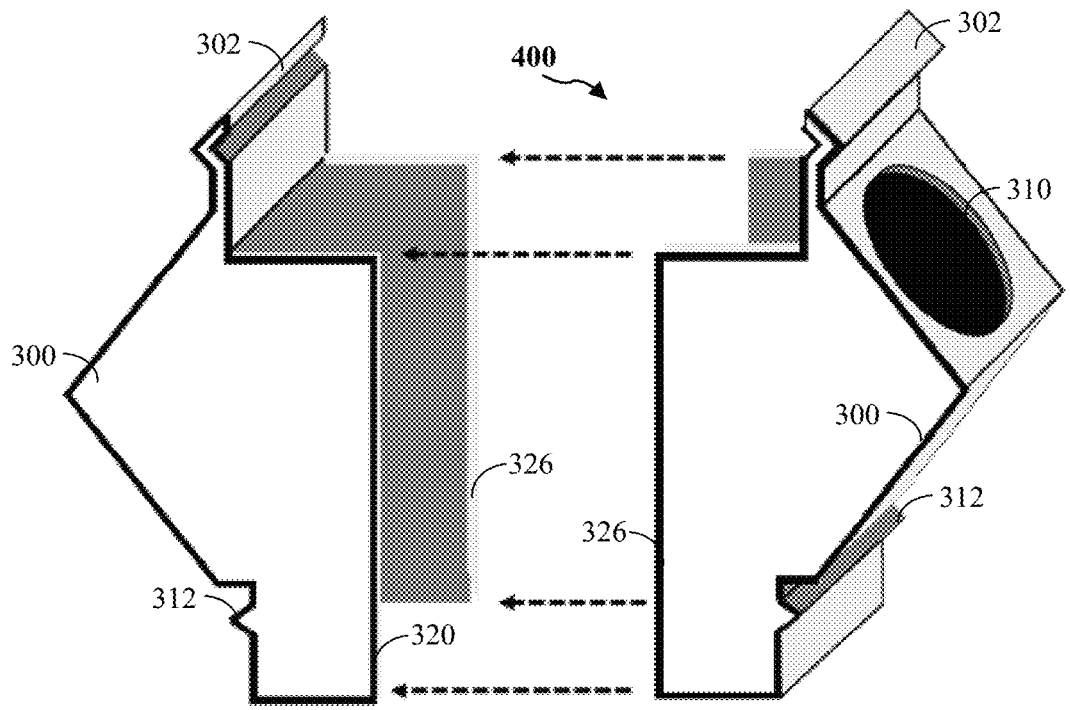
FIG. 4

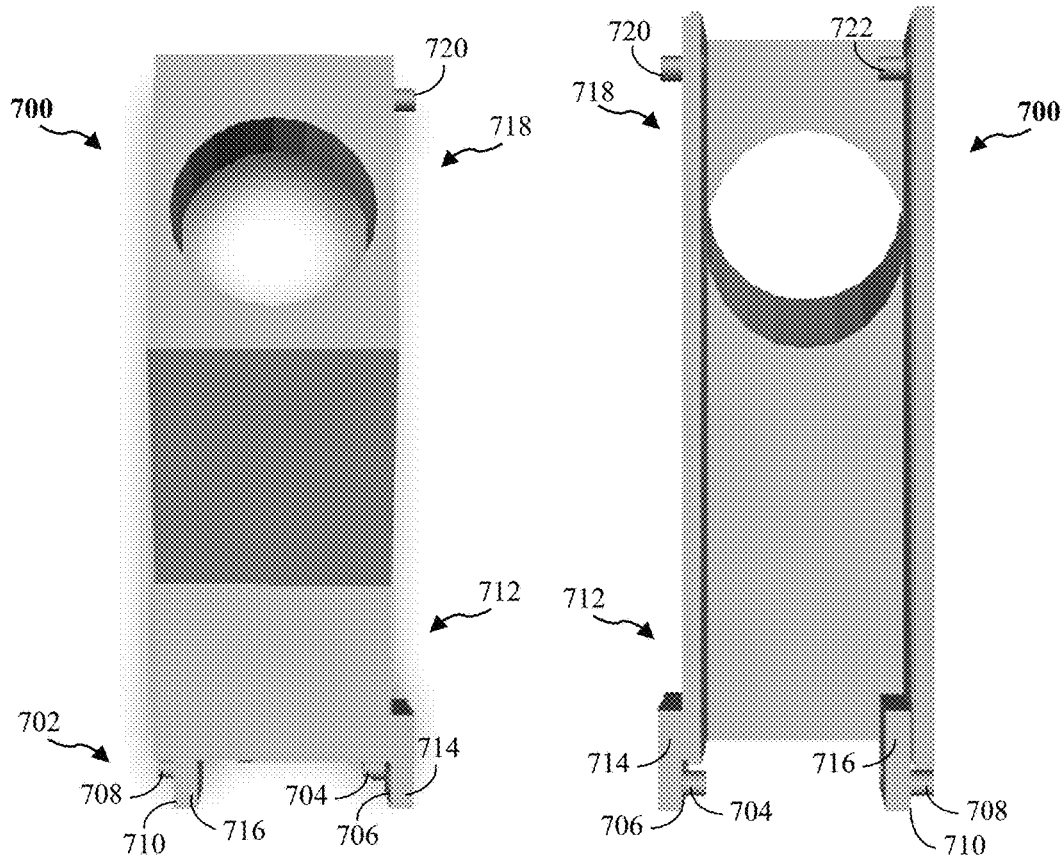
FIG. 7A  FIG. 7B
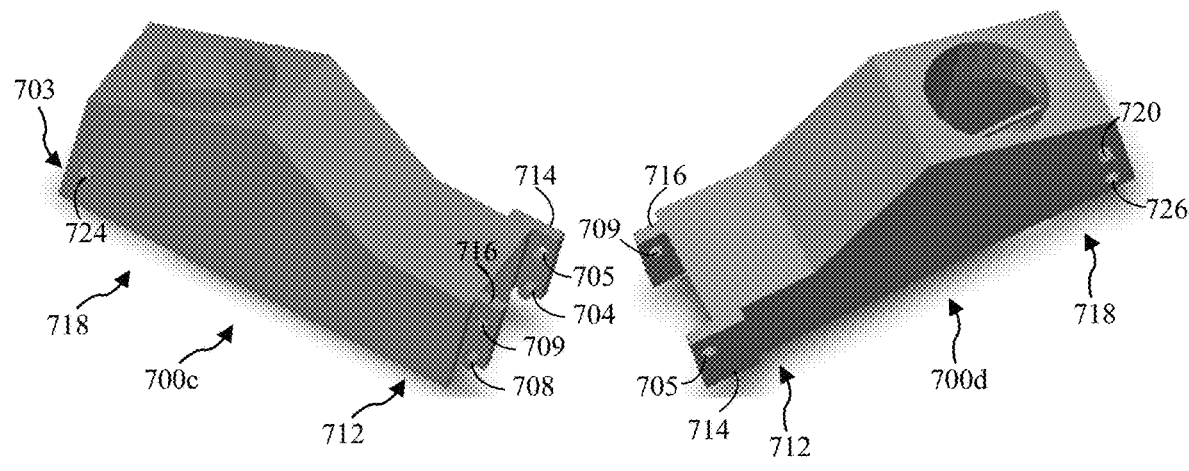
FIG. 7C  FIG. 7D

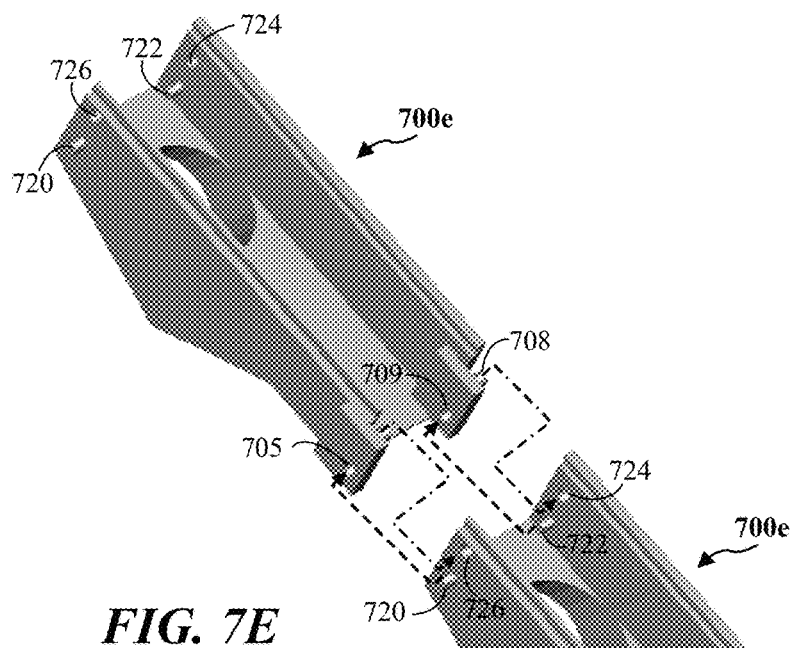
FIG. 7E
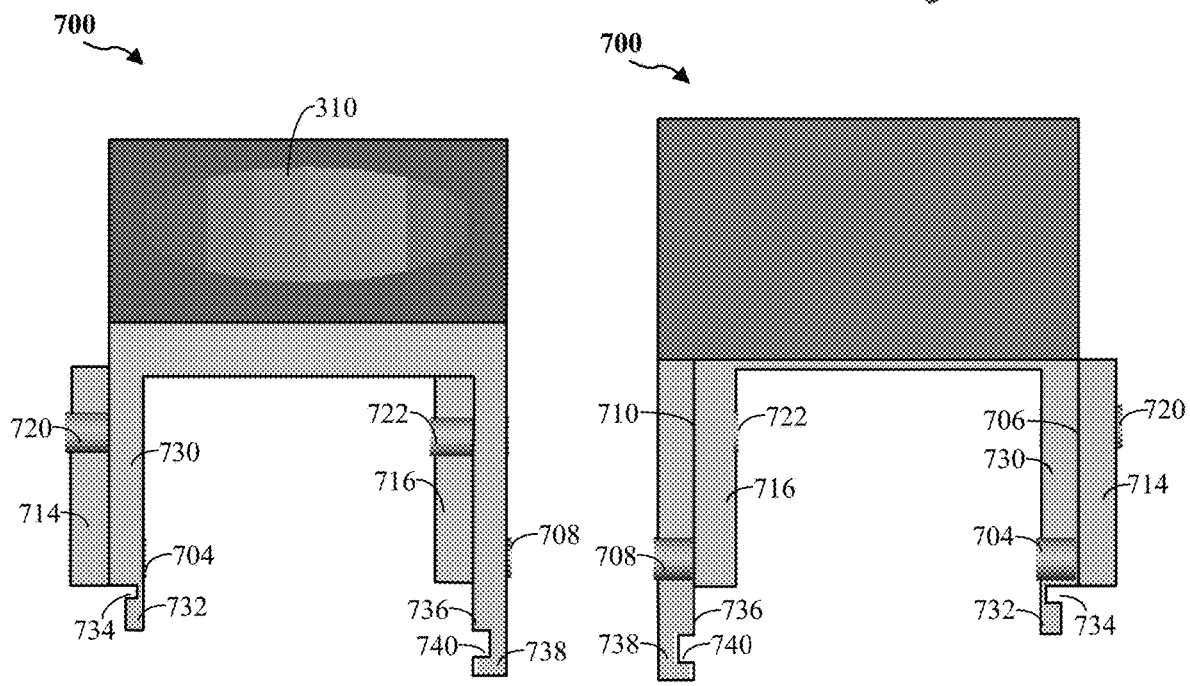
FIG. 7F
FIG. 7G

CULTIVATION VESSEL AND ASSEMBLY

CROSS-REFERENCE TO RELATED APPLICATIONS

This application claims priority to Provisional Patent Application No. 62/965,312, filed on Jan. 24, 2020, the contents of which are hereby incorporated by reference in its entirety.

FIELD OF TECHNOLOGY

Aspects and embodiments of the present invention relate to an agronomy vessel, more specifically to a modular vessel assembly for housing and cultivating a plant.

BACKGROUND

Cultivation of plants in mass quantities is costly and presents several challenges to a cultivator. Growers and cultivators are faced with limited resources needed for adequately and successfully growing and harvesting large quantities of plants and crops. Valuable resources necessary for cultivation of most plants, including water, soil, nutrients, utilities, contamination control, and real-estate, are often costly and in short-supply and, as such, can make plant cultivation expensive, environmentally unfriendly and limited in quantity. While the advent of hydroponics (i.e., a method of growing plants without the use of soil) has alleviated some limitations, there is still a need for a cost effective, efficient and scalable system and method for cultivating plants.

SUMMARY

Aspects of the present disclosure provide a modular vessel assembly configured to hold one or more plants in a cultivation environment. The vessel assemblies may be assembled from multiple components, each component having an identical design. Aspects of the present disclosure allow for high-volume production of a single component that is versatile enough to join with other identical or substantially similar components to form a tower of vessels configured to hold a number of plants during cultivation.

According to one aspect, a modular vessel is provided. The modular vessel may include a first module and a second module. Each module may include a body defining an upper portion, a central portion and a lower portion. The body may define a void in the central portion. A first male engagement may be disposed on a first interior wall and a second male engagement disposed on a first exterior wall. A first female engagement may be disposed on the interior wall and a second female engagement may be disposed on the exterior wall. A first edge may include a flange and a second edge may define a groove. The first module may be configured to couple to the second module by engaging the flange of the first module with the groove of the second module and the flange of the second module with the groove of the first module.

According to another aspect, a modular grow-tower is disclosed. The modular grow-tower may include a first tower half and a second tower half. Each tower half may include a plurality of modules. Each module may include a body defining an upper portion, a central portion and a lower portion. The body may define a void in the central portion. A first male engagement may be disposed on a first interior wall and a second male engagement may be disposed on a first exterior wall. A first female engagement may be disposed on the interior wall and a second female engagement disposed on the exterior wall. A first edge may include a flange and a second edge may define a groove. Each module of the first and second tower halves may be configured to couple by engaging the first male engagement of a first module to first female engagement of a lower module. The first tower half may be configured to couple to the second tower half by engaging the flanges of the modules of the first tower half with the grooves of the second tower half and the flanges of the second tower half with the grooves of the first tower half.

According to another aspect, a method of assembling a modular vessel is provided. The method may include engaging a first flange of a first vessel module with a first groove of a second vessel module. The first flange may be disposed on a first rear edge of the first vessel module and the first groove may be defined on a second rear edge of the second vessel module. A second flange of the second vessel module may be engaged with a second groove of the first vessel module. The second flange may be disposed on a third rear edge of the second vessel module and the second groove may be disposed on a fourth rear edge of the first vessel module.

BRIEF DESCRIPTION OF THE DRAWINGS

The above and other objects of the present invention will become more readily apparent from the following detailed description taken in connection with the accompanying drawings.

FIG. 3A is perspective views of a vessel module according to one aspect of the present disclosure.

FIGS. 3B-C are enlarged views of portions of the vessel module of FIG. 3A according to one aspect of the present disclosure.

FIG. 4 is an exploded view of a vessel assembly according to one aspect of the present disclosure.

FIG. 7A is a front-view of a vessel module according to one aspect of the present disclosure.

FIG. 7B is a rear-view of the vessel module of FIG. 7A according to one aspect of the present disclosure.

FIGS. 7C-D are perspective views of the vessel module of FIG. 7A according to one aspect of the present disclosure.

FIG. 7E is a rear-prospective view of a coupling of two vessel modules according to one aspect of the present disclosure.

FIG. 7F is a top-view of the vessel module of FIG. 7A according to one aspect of the present disclosure.

FIG. 7G is a bottom-view of the vessel module of FIG. 7A according to one aspect of the present disclosure.

DESCRIPTION

An agronomy system and assembly for cultivating plants is described. Aspects of the system may provide for efficient, cost-effective and large-scale growing environments. Generally, the system may include a plurality of slideable, or otherwise moveable, tower or column structures, each having a column with a vertical series of vessels for holding a netted pot or other container. The system may have an irrigation system in fluid communication with each tower providing an adequate fluid and nutrient supply to the netted pots in the vessels. The system may further include lamps to provide an adequate energy source. The system may also include sensors, monitors and controls to establish and maintain ideal environmental conditions suitable for proper plant growth.

Aspects of the present disclosure relate to a system for cultivating a plant in connection with similar systems and methods disclosed in the following U.S. Patent Applications, each of which is herein incorporated by reference in its entirety: U.S. patent application Ser. No. 15/705,545, U.S. patent application Ser. No. 15/707,462, and U.S. patent application Ser. No. 15/707,526.

Figure 1:
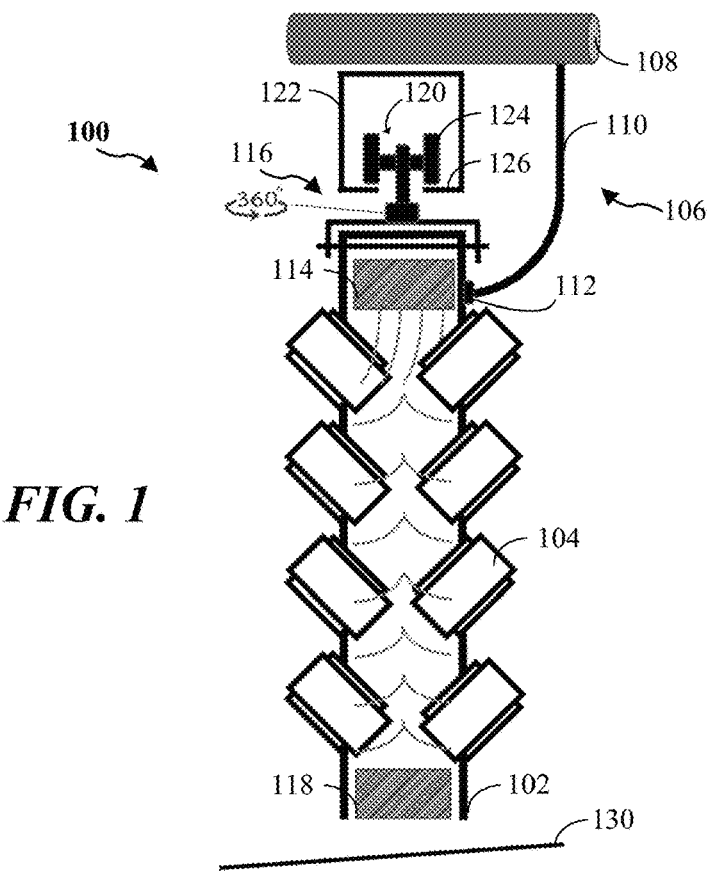
FIG. 1 is a side view of an exemplary cultivation assembly according to one aspect of the present disclosure.

FIG. 1 depicts a conceptual side-view of a cultivation assembly 100 according to one embodiment of the invention. The assembly 100 may include a column or tower body 102 and a series of substantially vertically arranged vessels 104, sized shaped and configured to hold a netted pot of a plant or other multicellular organism. An irrigation system 106 may provide fluids and nutrients, such as water, from a manifold 108 in fluid communication with the tower body 102. The fluid may flow from the manifold 108 through hoses 110, valves, pipes, or a combination thereof to a junction 112 or spout attachment on the tower body 102. The junction 112 may be a quick-release type, a screw attachment or the like. A porous or perforated material 114 may be disposed in a top, inside portion 116 of the tower body 102 to absorb the fluid entering the junction 112. As the porous or perforated material 114, such as a sponge, Styrofoam, colander foam, or the like, becomes saturated with the fluid, a gravity drip or flow commences and the fluid then flows to the netted pots residing in the vessels 104. The vessels 104 are shaped and arranged such that the netted pots are exposed to the fluid drip or flow through the tower body 102. A second porous or perforated material 118 may be disposed near the bottom of the inside of the tower body 102 to catch and absorb excess water not caught or absorbed by the plants in the netted pots and vessels 104. A structure to capture and redirect excess water, such as a basin or a sloped drain panel 130 may be further disposed below the tower body 102 so that any excess fluid flow from a saturated porous or perforated material may flow down the slope leading back to a reservoir (not shown) for recirculation of the fluid, via a pump or other plumbing.

The assembly 100 may include a mounting assembly 120 to mount the towers slidably to a track or rail 122, allowing the towers to hang and slide along the rail. The mounting assembly 120 may include one or more wheels 124 having a width wider than an opening in the rail 122 to which the mounting assembly 120 is hung. The rail 122 may be a substantially U-shaped with bottom flanges 126 for supporting the wheels 124 of the mounting assembly 120. The mounting assembly 120 may be inserted into an open end of the rail 122 and rolled or slid across the width of the rail 122 to a desired position. The mounting assembly 120 may be attached to the tower body 102 via a swivel 128 or other such mechanism that allows the tower body 102 to spin or rotate with 360 degrees of freedom.

Figure 2:
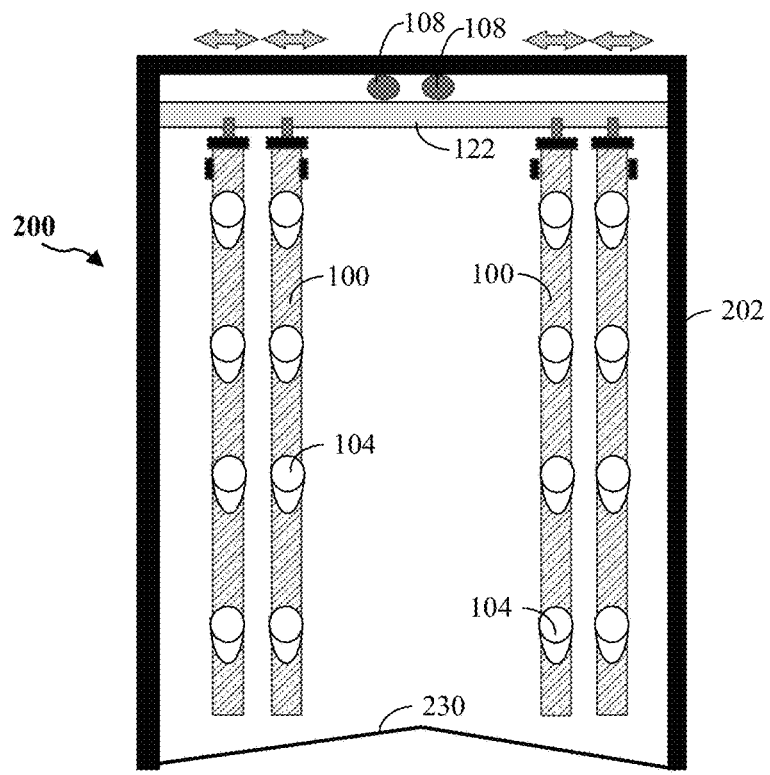
FIG. 2 is a front view of an exemplary cultivation assembly according to one aspect of the present disclosure.

FIG. 2 is a head-on view of a cultivation assembly 200 according to an embodiment of the invention. One or more tower assemblies 100 may be slid into an open end of a rail 122 that is affixed to a scaffold 202, frame, or other support structure. The tower assemblies 100 may slide laterally across the rail 122 through the scaffold 202 to provide easy access to the plants and vessels 104. One or more manifolds 108 may run atop the scaffold 202 providing fluid to the tower assemblies 100 via hoses, valves, and other connection points. A pitched floor 230 may run underneath the tower assemblies 100 to collect any excess flow of fluid to a reservoir. The floor may be pitched side-to-side, as well as front-to back. The pitched floor 230 allows for the collection of excess fluid into a reservoir where it can be recycled to the manifolds or other parts of the irrigation system.

FIG. 3 is a perspective view of a vessel module 300 according to one aspect of the present disclosure. The vessel module 300 (the module) may include an upper rail 302 coupled to or formed on an upper portion 304 of the module 300. The upper rail 302 may include or form a male engagement 306 and a female engagement 308. The male engagement 306 may include the outer portion of a bevel, bend, angular formation, or the like, while the female engagement 308 may include the inner, opposite portion of the same.

The module 300 may further define or include a void 310 formed at or near the center of the module 300. The void 310 may be sized, shaped and configured to receive a plant receptacle such as a netted pot or the like. According to one aspect, the module 300 may define the void 310 on an offset angle from a vertical axis, such that when a netted pot or plant receptacle is placed in the void, the plant may rest substantially at the offset angle from the vertical axis of the growing assembly or tower.

A lower rail 312 may be included or formed in the module in a lower portion 314 below the void 310. The lower rail 312 may be substantially similar to the upper rail 302 and include a male engagement 316 and female engagement 318 on outer and inner surfaces, respectively.

According to one aspect and shown in the enlarged portion of FIG. 3C, the module 300 may include a studded portion 320 disposed along a first abutting portion 322 of the module 300. The studded portion 320 may include one or more protrusions 324, extensions, pegs, knobs, nubs, or the like, extending from the first abutting portion 322. As shown in the enlarged portion of FIG. 3B, an opposing portion of the module 300 may include an engagement portion 328 along a second abutting portion 326 of the module. The engagement portion 328 may include one or more recesses, holes, cavities, voids, hollows, dimples, pits, or the like, configured to receive the studded portion 320 of a second vessel module 300, as described below.

FIG. 4 is an exploded view of a vessel assembly 400 according to one aspect of the present disclosure. According to one aspect, the vessel assembly 400 may include two modules 300 and be formed upon pressing the two modules 300 together such that the first abutting portion 320 and the second abutting portion 326 become coupled together by the respective studded portions 324 and engagement portions 328 of each module. A formed vessel assembly 400 may then include opposing upper rails 302 and lower rails 312, as well as opposing voids 310.

Figure 5:
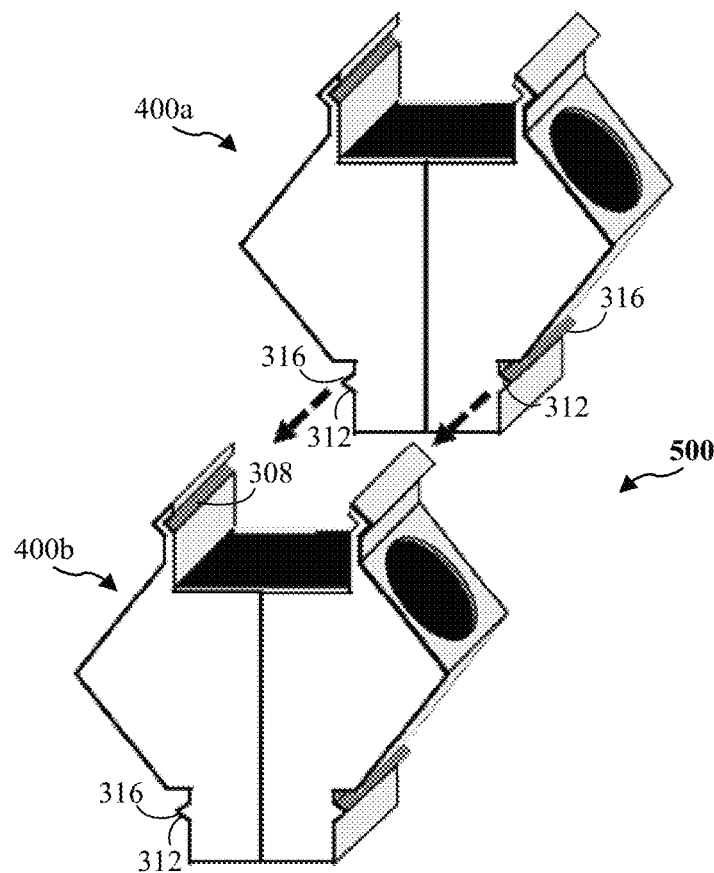
FIG. 5 is a perspective view of a coupling of vessel assemblies according to one aspect of the present disclosure.

FIG. 5 is a perspective view of a coupling 500 of vessel assemblies 400 according to one aspect of the present disclosure. According to one aspect, two or more vessel assemblies 400 may be coupled to form a vertical chain or tower of vessels (FIG. 1). A first assembly 400a may be coupled with a second assembly 400b by mating the male engagement 316 of the lower rail 312 of the first assembly 400a with the female engagement 308 of the upper rail 302 of the second assembly 400b. The male/female engagements may secure a number of assemblies 400 together to form a continuous self-coupling tower of variable height. The variability of the tower height may accommodate different spatial allowances in a growing environment.

Figure 6:
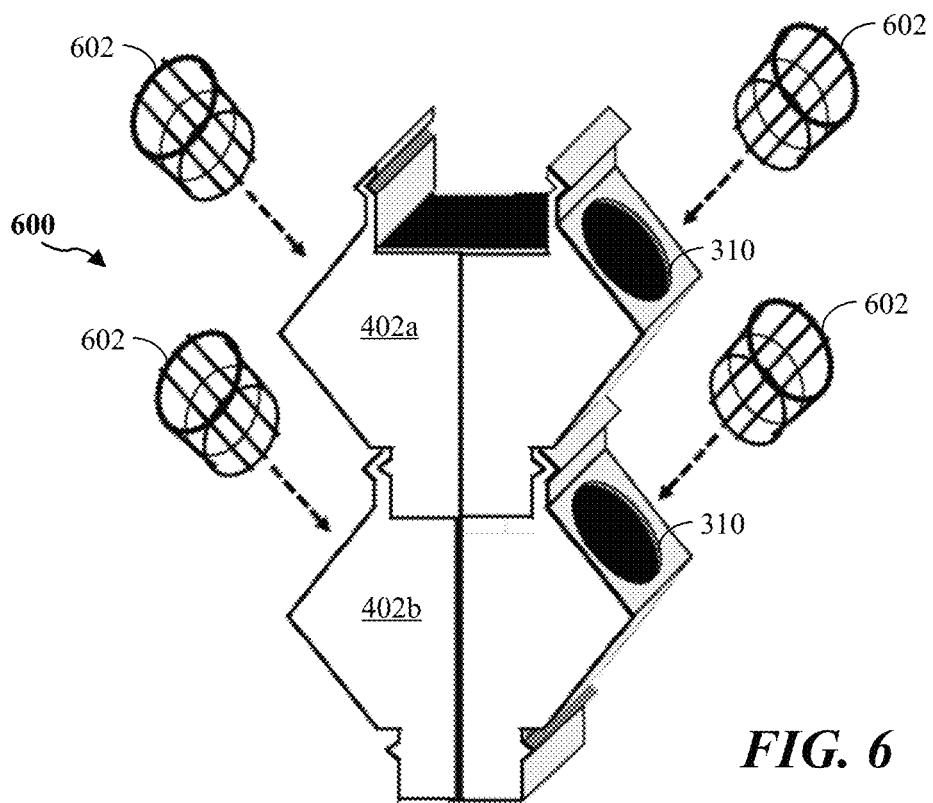
FIG. 6 is a perspective view of a multi-vessel assembly according to one aspect of the present disclosure.

FIG. 6 is a perspective view of a multi-vessel assembly 600 according to one aspect of the present disclosure. According to one aspect, and as mentioned previously, each vessel assembly 400 may form or include voids 310 configured to receive netted pots 602, or other plant receptacles. The netted pots 602 may rest at an angle offset from the vertical axis of the tower to allow easier access to light, nutrients, and plant maintenance.

Alternatively, aspects of the present disclosure provide for assembling a first side assembly of one or more vessels which may then be mated with corresponding second side assemblies to form a tower of vessels, all using multiple components of the same size and shape. FIGS. 7A-7H depict various views of a vessel side component 700 according to another aspect of the present disclosure. In contrast to the aspects previously detailed herein, the vessel component of FIGS. 7A-H may be part of a multi-vessel assembly that mates multiple side components 700 vertically to form a side assembly. Two side assemblies, as described below, (FIG. 9A-C) may then be mated to form a multi-vessel tower.

According to one aspect, the vessel side component 700 may include one or more male engagements 702, such as the upper interior studded portion 722 and upper exterior studded portion 720 of an upper portion 718 or the vessel side component 700. Similarly, a lower portion 712 may include interior studded portion 704 on an interior wall 706 and a lower exterior studded portion 708 on an exterior wall 710. According to one aspect, the lower interior studded portion 704 may be formed on an extended or externally offset portion 714 the interior wall 706. Similarly, the lower exterior studded portion 708 may be formed or included in a recessed or internally offset portion 716 of the exterior wall 710.

FIGS. 7C-E depict a perspective views of a left side 700c, right side 700d, and rear side 700e, 700e' of the vessel side component 700. According to one aspect of the present disclosure, the upper portion 718 of the vessel side component 700 may include female engagements 703, such as cavities, holes, pits, dips, or other recesses. According to one aspect the upper portion 718 may include or define one or more cavities 724, 726 arranged and size to receive the lower exterior studded portion 708 and lower interior studded portion 704, respectively, of second vessel side component 700.

Similarly, the lower portion 712 of the vessel side component 700 may include or define a cavity 709 on the internally offset portion 716 and a cavity 705 on the externally offset portion 714. The cavities 705, 709 may be arranged and sized to receive the upper exterior studded portion 720 and upper interior studded portion 722, respectively, of a second vessel side component 700. As shown in FIG. 7E, the coupling of a first vessel module 700e with a second vessel module 700e' may be accomplished by engaging the male engagements (720, 722, 704, 708) with their respective female engagements (705, 709, 726, 724).

Figure 7H:
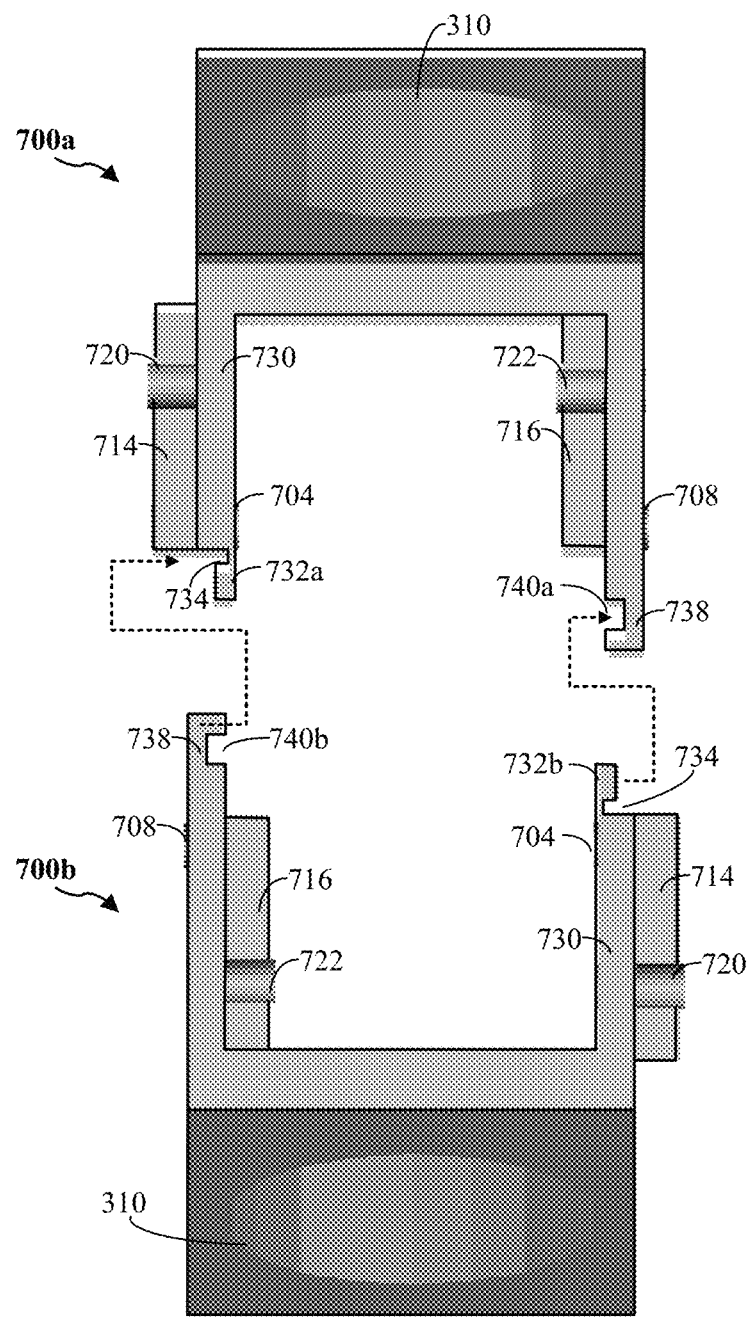
FIG. 7H is a top-view of a coupling of two vessel modules of FIG. 7A according to one aspect of the present disclosure.

FIGS. 7F and 7G depict a top-down view and bottom-up view respectively of a vessel side component 700 according to one or more aspects of the present disclosure. A first interior wall 730 may include a first flange 732 defining a first channel 734. A second interior wall 736 may include a second flange 738 defining a second channel 740. According to one aspect, the second interior wall 736 may be longer than the first interior wall 730. Additionally, the second channel 740 may be larger than the first channel 734, and may be sized and shaped to receive the first flange 732 in a sliding, secure coupling. FIG. 7H depicts a top-down view of an engagement of two vessel side components 700a, 700b. The first flange 732a of the first side vessel component 700a may be sized and shaped to engage securely the second groove 740b of the second side vessel component 700b. Likewise, the first flange 732b of the second side vessel component 700b may securely engage the first groove 740a of the first side vessel component 700a. The engagement of the respective flanges and grooves may be accomplished either through a sliding engagement, snap-fit, or other manner of alignment resulting in the secure coupling of the first side vessel component 700a and the second side vessel component 700b.

Figure 8A:
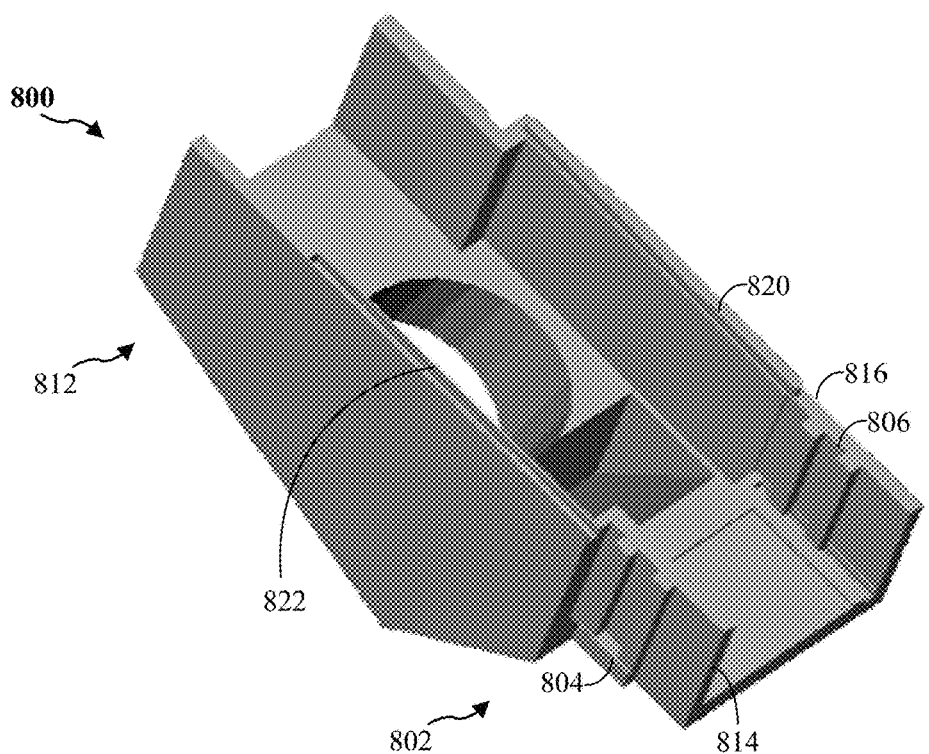
FIG. 8A is a perspective view of a rear side of a vessel module according to one aspect of the present disclosure.
Figure 8B:
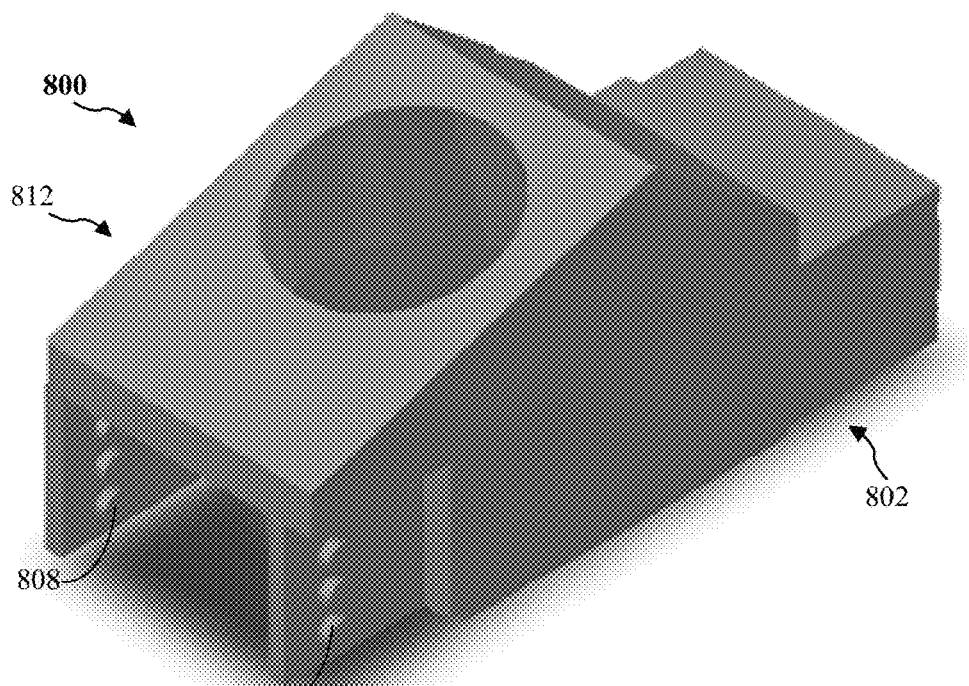
FIG. 8B is a perspective view of a front side of the vessel module of FIG. 8A according to one aspect of the present disclosure.

FIGS. 8A-B depict an alternative configuration of a modular vessel assembly 800 according to one or more aspects of the present disclosure. FIG. 8A depicts a rear, isometric view of the modular vessel assembly 800. The vessel component 800 may include a lower portion 802 featuring an interior female engagement 804 and an exterior female engagement 806. The female engagements may be sized and shaped to receive male engagements, such as interior male engagements 808 and exterior male engagements 810 of an upper portion 812 of the vessel component 800. The interior female engagement 804 may be disposed on or formed on an interior wall 814 while the exterior female engagement 806 may be disposed on or formed on an exterior wall 816 of the vessel component 800. According to one aspect, the exterior female engagement 806 may be included on an offset portion of the interior wall 814. Similarly, one or more of the male engagements 810 may be formed on an inset portion of the exterior wall. While the depicted vessel component 800 includes the male engagements on an upper portion 812 and female engagements on the lower portion 802, the arrangement may be reversed such that the female engagements are located on the upper portion 812 and the male engagements on the lower portion 802.

The vessel component 800, according to one aspect may further include or define a flange 820 on a first rear surface and a corresponding groove 822 on a second rear surface. The flange 820 and groove 822 may be sized and shaped to form a mating engagement between two vessel components 800, as described below.

Figure 10:
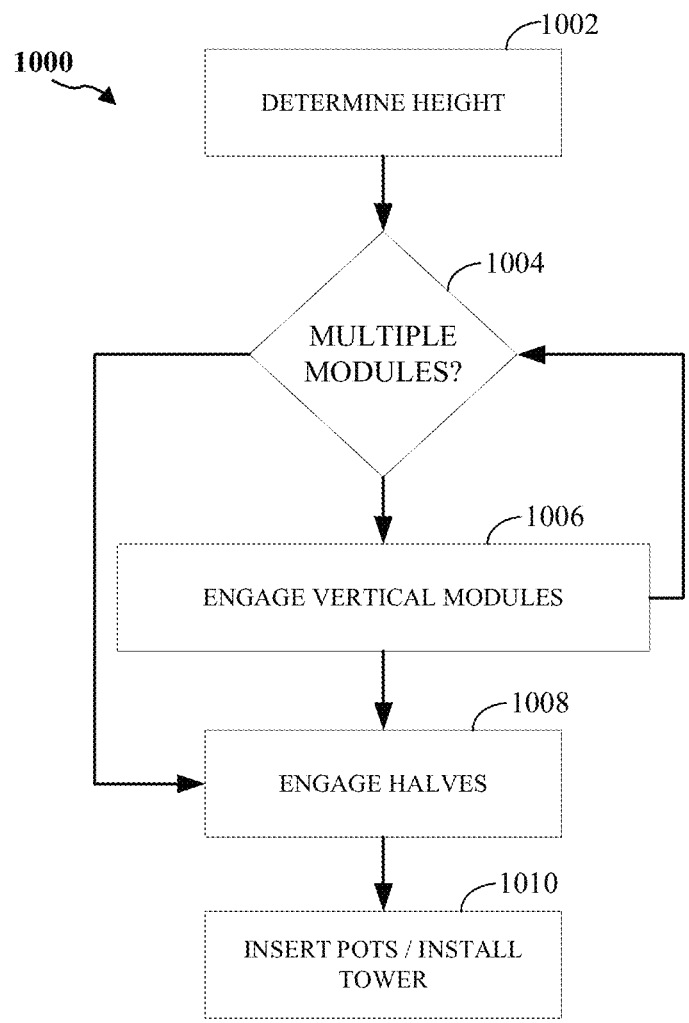
FIG. 10 depicts a method of assembling a grow tower according to one aspect of the present disclosure.

FIG. 10 depicts a coupling of a plurality of vessel components. According to one aspect the vessel components may be engagement vertically to form a tower half if variable height. As depicted, the male and female engagements may be coupled vertically, for example, by engaging the studded portion of one vessel component with the female engagements of a second component. A pressing fit may be applied to lock the components together, forming a tower half.

Figure 9A:
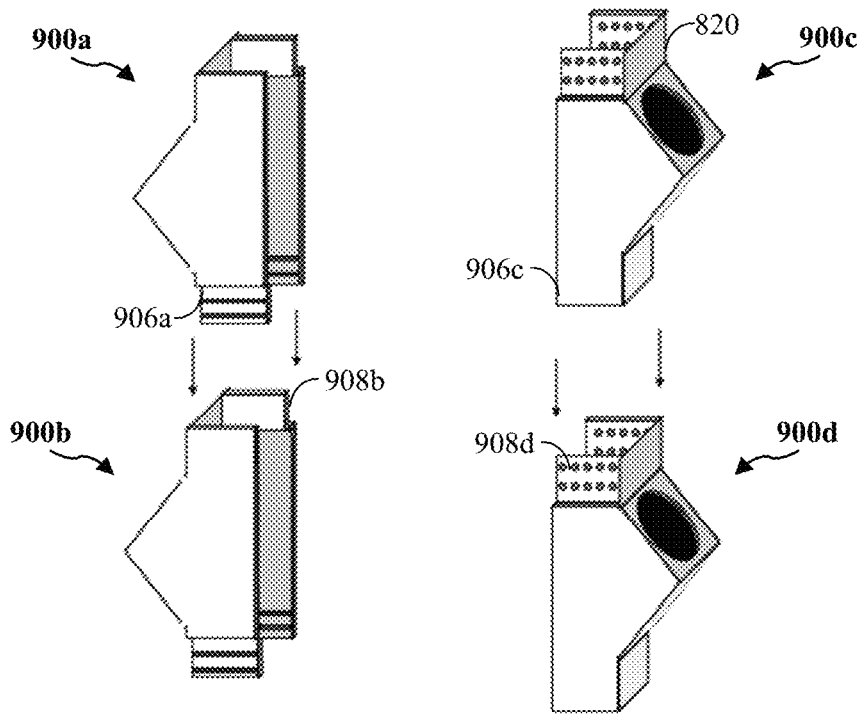
FIG. 9A is a perspective view of a coupling of vessel modules according to one aspect of the present disclosure.
Figure 9B:
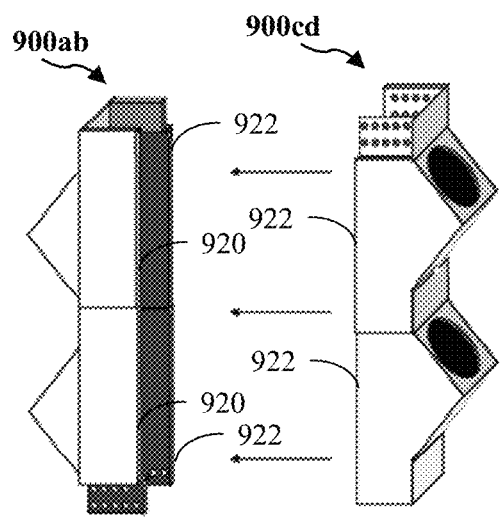
FIG. 9B is a perspective view of a coupling of vessel tower halves according to one aspect of the present disclosure.
Figure 9C:
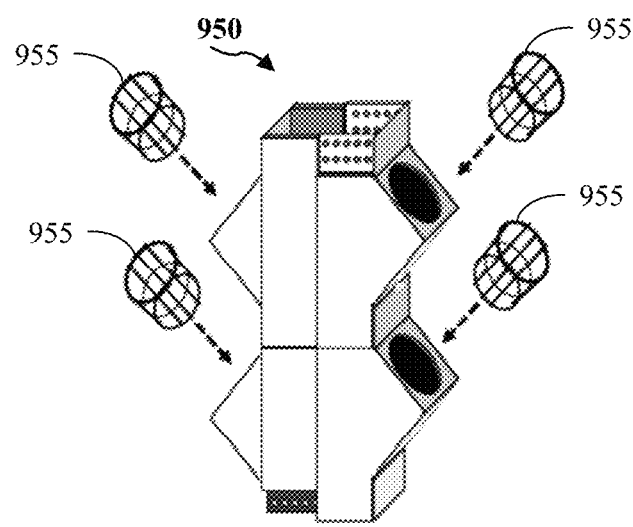
FIG. 9C is a perspective view of a tower assembly according to one aspect of the present disclosure.

FIG. 9A-C depicts a coupling of vessel components 900 to form a full tower. While FIG. 9A-C depict a coupling between vessel components such as those described and shown in connection with FIGS. 8A-B, one skilled in the art will appreciate that the coupling may be done using any of the modular components described in the present disclosure.

As shown in FIG. 9A, four vessel components 900a-d may be assembled to form a tower. One or more female engagements 906a of a first vessel component 900a may be coupled to one or more corresponding male engagements 908b of a second vessel component 900b. Similarly, one or more female engagements 906c of a third vessel component 900c may be coupled to one or more corresponding male engagements 908d of a fourth vessel component 900d.

As shown in FIG. 9B, a first tower half 900ab may be coupled to the second tower half 900cd. The flanges 920 of the first tower half 900ab may engage with the grooves 922 of the second tower half 900cd, and the flanges of the second tower half 900cd may engage the grooves 922 of the first tower half 900ab, thus securely coupling the halves together. The result, as depicted in FIG. 9C may be a fully formed vertical growing tower 950 of variable height ready to be installed in a growing environment and receive netted pots 955 or the like.

FIG. 10 depicts an exemplary method of assembling a modular vessel tower according to one or more aspects of the present disclosure. As shown in block 1002, a determination may be made as to the height of a potential grow tower. According to one aspect, the tower may be assembled two vertical halves of multiple vessel modules. As shown in block 1004, if a tower of multiple assemblies is desired, the modules of the first half may be assembled by engaging the male engagements of the vessel modules to the female engagements of the proximate vessel module, as shown in block 1006. These engagements may be repeated until the desired tower height is achieved. Similarly, the second half of the tower may be assembled in the same manner.

As shown in block 1008, once the two halves are assembled to the desired height, or if only a single vessel assembly is desired, the two halves of the modules/tower halves may be joined. As described herein, the flange/groove engagements may be coupled. That is the flanges of the first half may engage the grooves of the second half, and the flanges of the second half may engage the grooves of the first half. As described herein, the engagement of the two tower halves may be accomplished through a sliding engagement of the flange/grooves or by another fastening mechanism, such as snap-fit, friction fit, male/female engagements, or the like. As shown in block 1010, with the halves assembled in to a full tower, plant receptacles, such as netted pots or the like may be installed and the tower may be installed into the grow environment.

Advantages of the aspects of the present disclosure include a variable height and modular growing tower using a single component design. Because each vessel module is identical, they may be manufactured and assembled quickly and in a cost-effective manner, either through a molding process, three-dimensional printing or other manufacturing process. The modular vessel components may be made of or from any suitable material with sufficient structural integrity to support assembly, installation and operation to house one or more plants as described herein. For example, the modular vessel components may be made from or of plastic, PVC, other polymeric substance, Styrofoam, metal, or the like.

Although aspects have been described in detail for purposes of illustration, various modifications may be made without departing from the scope and spirit of the present disclosure. Accordingly, the disclosure is not to be limited by the examples presented herein, but is envisioned as encompassing the scope described in the appended claims and the full range of equivalents of the appended claims. The detailed description and drawings are merely illustrative of the present disclosure rather than limiting, the scope of the present disclosure being defined by the appended claims and equivalents thereof.

Benefits, other advantages, and solutions to problems have been described herein with regard to specific embodiments. However, the benefits, advantages, solutions to problems, and elements that may cause any benefit, advantage, or solution to occur or become more pronounced are not to be construed as critical, required, or essential features or elements of the disclosure.

It should be understood that when an element is referred to as being "connected" or "coupled" to another element (or variations thereof), it can be directly connected or coupled to the other element or intervening elements may be present.

Further, it should be appreciated that in the appended claims, reference to an element in the singular is not intended to mean "one and only one" unless explicitly so stated, but rather "one or more."

The description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The words "illustrative" or "exemplary" are used herein to mean "serving as an example, instance, or illustration." Any aspect described herein as "illustrative" or "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A modular vessel comprising:
   a first module and a second module, each module comprising:
   a body defining an upper portion, a central portion and a lower portion, the body defining a void in the central portion, the lower portion including an interior offset portion and an exterior offset portion;
   a first male engagement disposed on a first interior wall and a second male engagement disposed on a first exterior wall;
   a first female engagement disposed on the interior wall and a second female engagement disposed on the exterior the first female engagement defined on the interior offset portion, the second female engagement defined on the exterior offset portion;

a first edge extending along a first length of the central portion, the first edge including a flange;

a second edge extending along a second length of the central portion and substantially parallel to the first edge, the second edge defining a groove;

wherein the first module is configured to couple to the second module by engaging the flange of the first module with the groove of the second module and the flange of the second module with the groove of the first module.

2. The modular vessel of claim 1, further comprising:
a third and fourth module, the third module configured to couple to the first module by engaging the first male engagement of the first module to first female engagement of the third module and the first male engagement of the second module to the first female engagement of the fourth module.

3. The modular vessel of claim 2, further comprising:
each of the first, second, third and fourth modules comprising:
   a third male engagement disposed on a second exterior wall and a fourth male engagement disposed on a second interior wall;
   a third female engagement disposed on the first interior wall and a fourth female engagement disposed on the first exterior wall;
   wherein the first and third module are further configured to further couple by engaging the third male engagement of the first module with the third female engagement of the third module and the fourth male engagement of the first module with the fourth female engagement of the third module; and
   wherein the second and fourth module are further configured to further couple by engaging the third male engagement of the second module with the third female engagement of the fourth module and the fourth male engagement of the second module with the fourth female engagement of the fourth module.

4. The modular vessel of claim 1, wherein the first and second male engagements include one or more studs.

5. The modular vessel of claim 1, wherein the first and second female engagements include one or more cavities.

6. The modular vessel of claim 1, wherein the void is offset from a vertical axis at an angle.

7. The modular vessel of claim 1, wherein the engagement of the flange of the first module with the groove of the second module and the engagement of the flange of the second module with the groove of the first module are sliding engagements.

8. The modular vessel of claim 1, wherein the body is three-dimensionally printed.

9. The modular vessel of claim 1, wherein the body is a molded form.

10. The modular vessel of claim 1, wherein the body comprises a plastic.

11. The modular vessel of claim 1, wherein the body comprises PVC.

12. The modular vessel of claim 1, wherein the first and second male engagements each comprise a studded portion and the first and second female engagements comprise one or more recessed grooves.

13. The modular vessel of claim 1, wherein the defined void is sized and shaped to hold a netted pot.

14. A modular grow-tower comprising:
a first tower half and a second tower half, each tower half comprising a plurality of modules, each module comprising:
   a body defining an upper portion, a central portion and a lower portion, the body defining a void in the central portion, the lower portion including an interior offset portion and an exterior offset portion;
   a first male engagement disposed on a first interior wall and a second male engagement disposed on a first exterior wall;
   a first female engagement disposed on the interior wall and a second female engagement disposed on the exterior wall, the first female engagement defined on the interior offset portion, the second female engagement defined on the exterior offset portion;
   a first edge extending along a first length of the central portion, the first edge including a flange;
   a second edge extending along a second length of the central portion and substantially parallel to the first edge, the second edge defining a groove;
wherein each module of the first and second tower halves are configured to couple by engaging the first male engagement of a first module to first female engagement of a lower module; and
wherein the first tower half is configured to couple to the second tower half by engaging the flanges of the modules of the first tower half with the grooves of the second tower half and the flanges of the second tower half with the grooves of the first tower half.

* * * * *